United States Patent [19]

Williamson, III

[11] Patent Number: 4,490,448

[45] Date of Patent: Dec. 25, 1984

[54] LITHIUM/COPPER OXIDE OR LITHIUM/CADMIUM OXIDE ORGANIC ELECTROLYTE CELL

[75] Inventor: Thomas R. Williamson, III, Greenacres City, Fla.

[73] Assignee: Motorola, Inc., Schaumburg, Ill.

[21] Appl. No.: 448,107

[22] Filed: Dec. 9, 1982

[51] Int. Cl.³ .................. H01M 6/14; H01M 6/16; H01M 4/36; H01M 4/58

[52] U.S. Cl. .................. 429/194; 429/220; 429/222; 429/198

[58] Field of Search ............... 429/220, 222, 194, 198

[56] References Cited

U.S. PATENT DOCUMENTS

| | | | |
|---|---|---|---|
| 3,413,154 | 11/1968 | Rao | 136/100 |
| 3,468,716 | 9/1969 | Eisenberg | 136/100 |
| 3,484,296 | 12/1969 | Buzzelli | 136/100 |
| 3,511,716 | 5/1970 | Gabano et al. | 136/100 |
| 3,562,017 | 2/1971 | Lyall | 136/6 |
| 3,658,592 | 4/1972 | Dey | 136/6 |
| 3,681,143 | 8/1972 | Dey | 136/83 R |
| 3,681,144 | 8/1972 | Dey et al. | 136/83 R |
| 3,726,716 | 4/1973 | Athearn | 136/100 R |
| 3,736,184 | 5/1973 | Dey | 136/6 LN |
| 3,769,092 | 10/1973 | Dechenaux | 136/100 R |
| 3,877,988 | 4/1975 | Dey et al. | 136/83 R |
| 3,915,740 | 10/1975 | Eisenberg | 136/6 LN |
| 3,920,477 | 11/1975 | Alaburda | 136/108 |
| 3,945,848 | 3/1976 | Dey et al. | 136/100 |
| 3,951,685 | 4/1976 | Kronenberg | 429/220 X |
| 3,960,595 | 6/1976 | Lehmann et al. | 136/6 LN |
| 4,091,188 | 5/1978 | Dey | 429/174 |
| 4,129,691 | 12/1978 | Broussely | 429/197 |
| 4,172,927 | 10/1979 | Toyoguchi et al. | 429/194 |
| 4,195,122 | 3/1980 | Margalit et al. | 429/194 |
| 4,390,604 | 6/1983 | Evans et al. | 429/222 X |

FOREIGN PATENT DOCUMENTS

| | | | |
|---|---|---|---|
| 50843 | 4/1979 | Japan | 429/222 |
| 1353113 | 2/1972 | United Kingdom . | |

Primary Examiner—Brian E. Hearn
Assistant Examiner—Stephen J. Kalafut
Attorney, Agent, or Firm—Donald B. Southard; James W. Gillman; Edward M. Roney

[57] ABSTRACT

The invention is a high energy density electric cell having a lithium anode, and a copper oxide or cadmium oxide cathode. The electrolyte of the electric cell can be an organic solvent composed of propylene carbonate or nitromethane or a mixture of the two. The solute for the electrolyte is a soluble salt selected from the group of potassium hexafluorophosphate, lithium hexafluorophosphate and benzl trimethylammonium hexafluorophosphate.

2 Claims, No Drawings

LITHIUM/COPPER OXIDE OR LITHIUM/CADMIUM OXIDE ORGANIC ELECTROLYTE CELL

BACKGROUND OF THE INVENTION

This invention relates to a novel composition for an electric cell comprising a lithium anode and a copper oxide or cadmium oxide cathode with an organic electrolyte potassium hexafluorophosphate-propylene carbonate. The electric cell is designed to supply the electrical energy for a watch module for a period in excess of one year while maintaining a potential sufficiently high to ensure proper circuit operation.

In development of an electrochemical system, certain prerequisites are needed. There must be an anode and a cathode in some form of electrolyte which conducts ions but not electrons. This electrolyte may be a solid, liquid or gas, with liquid being the most common. The electrolyte of an electric cell is a solvent which acts as a transport medium and a solute which actually carries the ions between the anode and cathode. For many electrical cell applications water is the solvent of choice. Where small size and long life are important, water has been found to be unsatisfactory as a solvent choice.

Usually small watch electric cells use a light metal anode, particulary lithium. An organic solvent is required with a lithium anode due to the intense reactivity of lithium with water according to the reaction: $Li + H_2O \rightarrow LiOH + \frac{1}{2}H_2$. A lithium anode electrical cell using water as a solvent would lead to an electric cell with a short shelf life due to loss of the lithium anode and to generation of hydrogen pressure within the cell which would be undesirable in sealed cells which are commonly used in electric watches. Therefore, the use of an organic solvent in a lithium anode electric cell is necessary to achieve a small sealed electric cell with desirable commercial characteristics of long shelf-life and long steady use-life.

Unfortunately, many organic solvents are unstable in the presence of lithium. Therefore, it is necessary to find and utilize a solvent which is unreactive to lithium. One such suitable solvent is known to be propylene carbonate. Another known suitable solvent is nitromethane. A wide variety of other solvents exist which are known to be stable in the presence of lithium. The solvent of the electrolyte must be stable in the presence of the chosen electric cell cathode in addition to demonstrating stability in the presence of a lithium anode.

An electric cell cathode is initially chosen to meet two significant criteria: (1) The electrochemical potential difference between the cathode and the lithium anode, as predicted from thermodynamics, is of sufficient magnitude to be usable in the cell application; (2) The anode and cathode should be chosen to produce the highest energy density possible. Regarding the first criterion, while thermodynamic calculation may predict the electromotive force (emf) of the cathode and lithium anode under certain prescribed circumstances, it may in practice be found that a substantially different reaction results and indeed a different potential exists. A case in point is the use of a lithium anode with a manganese dioxide cathode. If this were to discharge according to the reaction:

$$4 Li + MnO_2 \rightarrow Mn + 2 Li_2O$$

a potential of about 1.5 volts would be obtained from the free energies of formation of the compounds used. In practice, however, it is found that a more likely reaction is:

$$2 Li + 2 MnO_2 \rightarrow Mn_2O_3 + Li_2O$$

which yields a predicted emf of about 3.0 volts. Thus while a particular electrochemical anode and cathode couple is selected for a particular application by established thermodynamic methods, only empirical studies will show the true reaction and capabilities of the system.

While the theoretical potential, i.e. the electrical potential available from a selected anode-cathode couple, is easily calculated, there is a need to choose a non-aqueous electrolyte that permits the actual potential produced by the complete electric cell to approach the theoretical potential to a practical degree. It is practically impossible to predict in advance how well a non-aqueous electrolyte will function in this respect with a selected couple. More broadly stated, an electric cell must be considered as whole units, each unit having three parts which parts are not predictably interchangeable from unit to unit.

The second criterion for choosing an electric cell cathode is the anode-cathode energy density. The anode-cathode couple with the highest energy density is the most desireable. This usually is determined on either a volumetric or gravimetric basis. For volumetric needs a high density, low atomic or molecular weight material is chosen. For a gravimetric application, a low density, low atomic weight or molecular weight material will be the choice. Additionally, the number of electrons that an element or compound may gain or lose will act as a multiplier of the energy density. While lithium has a low density, its low atomic weight allows it to be a viable anode for volumetric as well as gravimetric applications. The oxides of metals have been found to be particularly suitable cathodes for use in gravimetric applications, with the oxides of heavy metals having suitable densities for volumetric energy density considerations.

Unfortunately, one cannot just select a particular electrochemical anode-cathode couple and one of the known electrolytes and make an electric cell. In addition to the reactive considerations discussed above, it may be found that either the lithium anode or the cathode selected are unreactive in the chosen solvent. Passivating layers may form on the surface of the lithium anode, or the selected cathode may react at such a low rate as to become severely polarized which results in a drop in potential and resulting lack of ability to do useful work. The selected solvent must exhibit adequate conductivity by virtue of its ability to solvate the solute ions. The viscosity of the solvent must be low enough not to impede the transport of the solvated ions. This is all clearly a trial and error process after the original theoretical calculations indicate the possibility of a viable potential. Thus, development of an electrochemical system, while guided by theoretical considerations, requires trial and error methods to determine if the system is viable in the real world.

After an appropriate anode-cathode couple and solvent have been chosen a suitable solute for the electrolyte must be determined. One of the first considerations is that the solute must be stable with the chosen solvent. Of course, the solute must be soluble in the solvent. Also the solute must be capable of carrying ionic charges during discharge from the cathode to the anode and vice versa. Ions must be transported both to the anode (negatively charged ions) and to the cathode (positively charged ions). The ionic components of the solute act to transport electrons from the cathode to the anode which then flow back to the cathode through the external circuit, thereby doing useful work. Therefore a good solute is critical to the successful creation of an electric cell.

Therefore, it is an object of this invention to compose an electric cell which exhibits a potential voltage under normal load conditions which is suitable for watch battery applications.

It is a further object of this invention to compose an electric cell using an organic solvent which exhibits a shelf-life which is far superior to comparable aqueous electric cells, thus giving improved commercial utility and eliminating gas discharge to allow the electric cell to be sealed.

Finally, it is an object of this invention to provide an electrolyte which will function with the anode-cathode couple of lithium and copper oxide or cadmium oxide in a manner to give long use-life, long shelf-life and steady output potential.

BRIEF DESCRIPTION OF THE INVENTION

The invention is a high energy density electric cell having a lithium anode, and a copper oxide or cadmium oxide cathode. The electrolyte of the electric cell can be an organic solvent composed of propylene carbonate or nitromethane or a mixture of the two. The solute for the electrolyte is a soluble salt selected from the group of potassium hexafluorophosphate, lithium hexafluorophosphate and benzl trimethylammonium hexafluorophosphate.

DESCRIPTION OF THE PREFERRED EMBODIMENT

A lithium and copper oxide anode-cathode couple has a theoretical potential of 2.24 volts according to the reaction:

$2Li + CuO \rightarrow Cu + Li_2O$

As with most lithium based electric cells, the basic problem is selection of an electrolyte which allows the desired rate of discharge to be achieved. For present electric watch applications a desired rate would lie in the range of 10 microamps per square centimeter or higher. It has been found that the electrolyte propylene carbonate with 0.5 to 1.0 M potassium hexafluorophosphate dissolved therein, allows a current discharge rate considerably higher than this figure when surface area is limited such as in a watch cell, while maintaining a potential in excess of 1.4 volts. Satisfactory performance has also been found for the solutes lithium hexafluorophosphate or benzyl trimethylammonium hexafluorophosphate. Also, a solvent of nitromethane can be used instead of propylene carbonate, or a mixture of nitromethane and propylene carbonate may serve as the electrolyte solvent.

Conductivity within the copper oxide cathode was improved by the use of conductive carbon powders, and the cathode electrode was held together with carboxymethyl cellulose or finely divided polyethylene resin binder (i.e. Microthene, trademark U.S. Ind. Chemicals). The lithium foil anode was pressed onto an expanded metal grid substrate. If the electric cell is constructed as a sealed button cell of the type used for electric watches, the lithium anode can be pressed into one internal side of the cell.

An example of a suitable cell is:

(1) A lithium foil anode pressed onto nickel expanded metal grid.

(2) A copper oxide cathode containing 65% divalent copper oxide, 20% conductive carbon such as Conductex SC or Conductex 950 (trademark of Columbian Carbon Div. of Cities Service) and 15% suitable finely divided polyethylene resin binder such as Microthene FN 510 (trademark U.S. Industrial Chemicals). As an alternative the copper oxide cathode could be pressed onto a nickel expanded metal grid.

(3) 0.5 to 1.0 Molar potassium hexafluorophosphate in propylene carbonate as the electrolyte.

(4) The anode and cathode were separated by nonwoven polypropylene material which acts as an absorbent reservoir for the electrolyte and which serves to keep the electrodes electrically separated while in contact with the electrolyte.

The theoretical capabilities of the lithium/copper oxide cell are: (1) 0.622 Ah/g; (2) 2.125 Ah/cm$^3$; (3) potential of 2.24 V open circuit. For reference, silver oxide/zinc cells (used in watch batteries) have: (1) 0.269 Ah/g; (2) 2.327 Ah/cm$^3$; (3) potential of 1.60 V open circuit. Experimental results showed that the lithium and copper oxide cells exhibited a utilization of between 60% to 90% of theoretical of the cathode. The lithium anode was in excess. A lithium/cadmium oxide electric cell has: (1) 0.376 Ah/g; (2) 1.282 Ah/cm$^3$; (3) 1.74 V open circuit, but has the added advantage of rechargeability.

For a cadmium oxide cathode, the binder should be a ethylene-propylene copolymer or terpolymer such as Vistalon or a polyisobutylene such as Vistanex (trademarks of Exxon) and should contain nickel powder and cadmium powder. The solvent for the electrolyte in a lithium/cadmium oxide electric cell can be propylene carbonate or nitromethane or a mixture of the two. The solute can be selected from the same group used with a lithium/copper oxide electric cell. To improve conductivity within the cadmium oxide cathode, the cathode contains a conductive diluent such as cadmium powder formed from condensation of metal vapors. The cadmium powder is stabilized by a layer of cadmium oxide on the surface of the powder.

In the course of my study of the lithium/copper oxide and lithium/cadmium oxide couples, I set up many different electolyte solvents with pieces of lithium in them. Once suitable compatibility had been shown, I continued with the best solvents in the presence of suitable cathodes. Once an anode/cathode/solvent system was established, various solutes in varying concentration were added to the solvent. Anodes and cathodes were placed in the electrolyte and potentials measured. Further, discharge was accomplished through an external load resistance with the voltage monitored with time on a recorder. This led to suitable systems for consideration. The next step was to make sealed cells. These were made by fashioning the anode and cathode into suitable electrodes for assembly and enclosing them with electrolyte in sealed cell cans.

Once the system was so defined, further capacity (ampere-hours) tests continued along with shelf life, temperature and rate measurements. This led to the lithium/copper oxide cell finally being made into watch-size cells for further study including powering actual watch circuits. Results indicated a suitable system with long life and long shelf-life. Further study continued with cadmium oxide electrodes. This system indicated good capacity at higher rates than copper oxide and also shows capability of being recharged.

What is claimed is:

1. A rechargeable cell comprising a lithium anode, a cadmium oxide cathode containing as a binder an ethylenepropylene copolymer or terpolymer, an electrolyte solvent selected from the group consisting of propylene carbonate and nitromethane or a mixture thereof, with a soluble salt dissolved therein which is selected from the group consisting of potassium hexafluorophosphate, lithium hexafluorophosphate and benzyl trimethylammonium hexafluorophosphate.

2. The cell of claim 1 wherein the cadmium oxide cathode contains as a binder polyisobutylene.

* * * * *